July 14, 1953 — R. HEIDECKE — 2,645,170
FILM GUIDE STRUCTURE FOR PHOTOGRAPHIC CAMERAS
Filed June 17, 1950

REINHOLD HEIDECKE
Inventor

By Charles Shepard
Attorney

July 14, 1953　　　R. HEIDECKE　　　2,645,170
FILM GUIDE STRUCTURE FOR PHOTOGRAPHIC CAMERAS
Filed June 17, 1950　　　2 Sheets-Sheet 2

REINHOLD HEIDECKE
Inventor

By Charles Shepard

Attorney

Patented July 14, 1953

2,645,170

UNITED STATES PATENT OFFICE 2,645,170

FILM GUIDE STRUCTURE FOR PHOTOGRAPHIC CAMERAS

Reinhold Heidecke, Braunschweig, Germany, assignor to Franke & Heidecke, Fabrik Photographischer Präzisions - Apparate, Braunschweig, Germany, a firm Application June 17, 1950, Serial No. 168,723
In Germany June 23, 1949

4 Claims. (Cl. 95—31)

The present invention relates to the construction of photographic cameras, and more particularly to the construction of a film guide or film holding means for holding the film flat in the focal plane of the camera.

An object of the invention is the provision of generally improved and more satisfactory means for holding the film flat in the focal plane, particularly means for holding the film in proper position notwithstanding the fact that the film may, at different times, be of different thickness or different widths, or both.

Another object of the invention is the provision of film holding or guiding means which may be adjusted easily and simply to accommodate film of different widths or different thickness, or both.

A further object is the provision of film guiding means so designed that, although it will hold the film smoothly in the desired flat condition, yet it will not cause scratches in or other damage to the film.

These and other desirable objects are accomplished by the construction disclosed as an illustrative embodiment of the invention in the following description and in the accompanying drawings forming a part hereof, in which.

The same reference numerals throughout the several views indicate the same parts.

Certain types of photographic cameras are used sometimes with normal roll film having a protective paper backing, and sometimes with film which does not have such paper backing, the over-all thickness of the film being, in that case, less than the thickness of film with backing. Also, the camera is to be used sometimes with film of one width (for example, the maximum or full width of film strip which can be accommodated by the camera) and sometimes with film of a narrower width. The present invention provides an improved structure for accommodating these varying thicknesses and varying widths of film, holding the film always flat and true in the focal plane of the camera regardless of these varying thicknesses and widths, yet without applying such pressure to the film as may cause scratches when the film is moved for feeding forwardly to take a new exposure.

The camera body or housing, the rear part of which is indicated in general at 1, is provided with the usual film aperture plate or frame plate 2 having vertically extending guide rails 3 and 4 on which the lateral edges of the film rest as the film is being fed forwardly step by step from one to the other of the two film spool chambers 5 and 6. The front face of the film, at its lateral edges, lies against the rear faces of the rails 3 and 4, the rear faces of these rails lying in a plane a little rearwardly of the rear face of the rest of the aperture plate 2. The usual film guide rollers 7 and 8 may be provided, near the top and bottom edges, respectively, of the film aperture plate 2.

Figure 2:
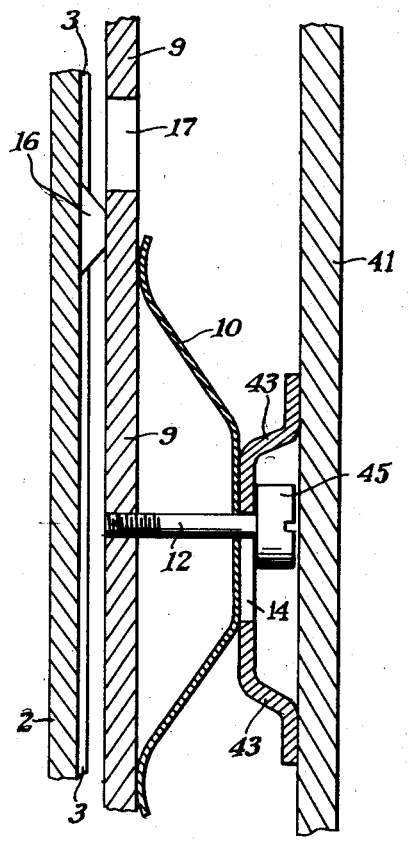
Fig. 2 is a diagrammatic vertical section taken through one of the presser plate springs and associated parts.
Figure 1:
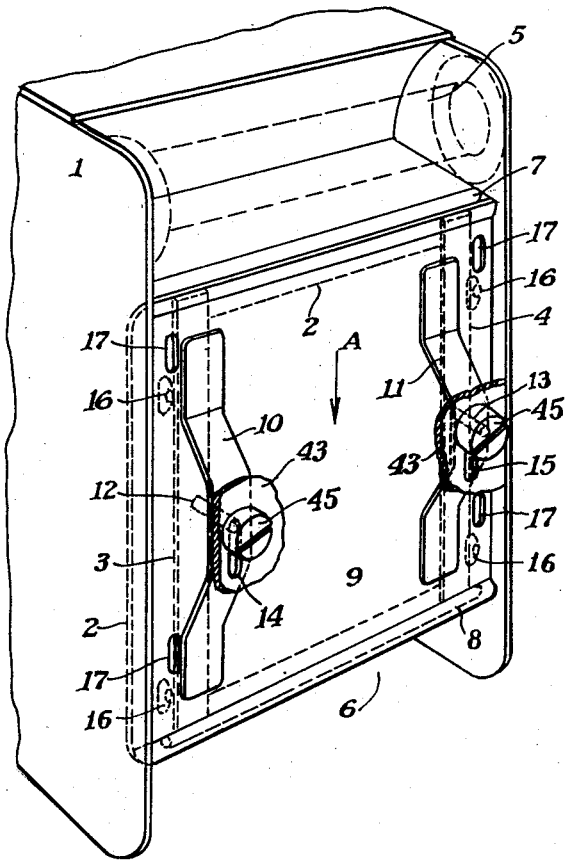
Fig. 1 is a somewhat diagrammatic perspective view of the rear part of the body of a camera in accordance with one embodiment of the present invention, with the cover plate removed, and with the parts adjusted to provide a film channel of normal thickness and width.
Figure 3:
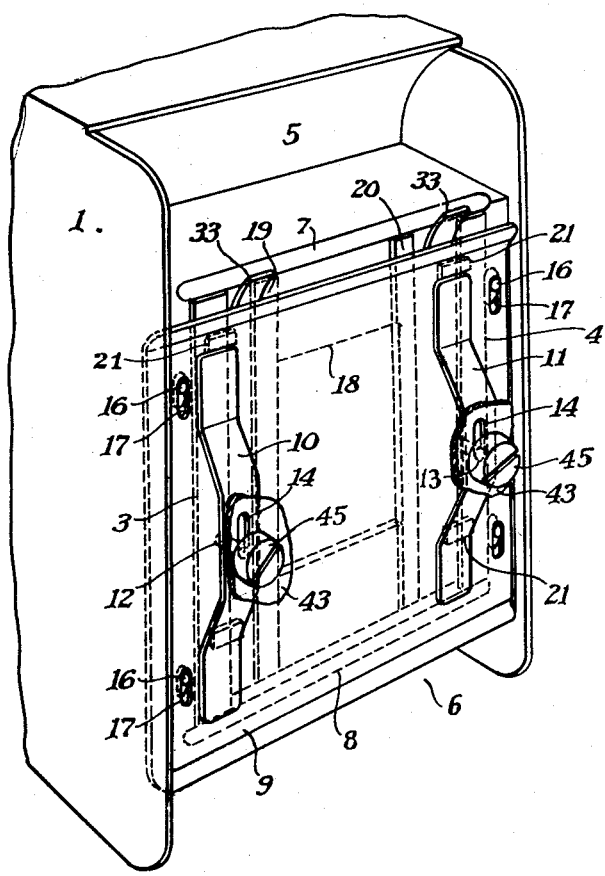
Fig. 3 is a view similar to Fig. 1, showing the parts in a different position of adjustment to provide a film channel of less thickness and less width than in Fig. 1.

The rear wall of the camera is, as usual, in the form of a removable cover, omitted from Figs. 1 and 3 for the sake of clearness, but fragmentarily shown at 41 in Fig. 2. On the forward side of this cover 41, and supported therefrom, is the film presser plate 9 which is under the influence of two leaf springs 10 and 11 (Figs. 1 and 2) interposed between the cover 41 and the presser plate 9, so as to press forwardly on the rear face of this plate near its two lateral edges and to urge the plate gently forwardly against the rear side of the film (or the rear side of the protective paper, if film with protective paper is used).

It is found in practice that if the springs 10 and 11 are made of the proper tension and dimensions to give the proper degree of pressure when the presser plate 9 rests against film with backing paper, there is likely to be an insufficient degree of forward pressure on the presser plate 9, when the camera is used with film having no backing paper. On the other hand, if the tension and size of the springs 10 and 11 are made correct for exerting the proper pressure on film having no backing paper, then if the camera is used with film having backing paper, the extra thickness of which holds the presser plate 9 farther rearwardly, this sometimes results in applying too great pressure to the film, causing undesirable frictional drag on the feeding movement of the film, and sometimes even causing scratches in the film.

To overcome these undesirable features, the present invention provides means for holding the presser plate 9 rearwardly at the proper distance from the aperture plate 2, to provide a film channel of the requisite thickness to accommodate film with paper backing, without undue pressure on the film, the parts being adjustable to allow the presser plate 9 to move farther forwardly to provide a thinner film channel, when the parts are to be used, for example, with film having no paper backing. To this end, the presser plate 9 is made slightly movable relatively to the cover 41, in the direction of its own plane, the movement in such direction serving to adjust the thickness of the film channel.

The presser plate 9 and the springs 10 and 11 are supported from the back wall 41 by means of a pair of headed studs or screws 12 and 13, respectively passing approximately through the midpoints of the respective springs 10 and 11, and having their forward ends screwed into or otherwise anchored in the presser plate 9. The rear ends of the studs 12 and 13, as best seen in Fig. 2, extend through vertical slots 14 and 15 in stirrup members 43 secured to the inner or forward face of the back wall 41, and the studs have enlarged heads 45 slidably but snugly received between the stirrup members 43 and the back wall 41.

The aperture plate 2 is provided at suitable points (for example, at four points near the four corners of the aperture plate, and slightly outside of the guide rails 3 and 4) with rearwardly extending projections or protuberances 16 (Figs. 1 and 2) against which the front face of the presser plate 9 normally lies, to determine the normal thickness of the film guiding channel, for accommodating ordinary normal film with a paper backing. When the camera is to be used with thinner film (for example, film alone, without the paper backing) then the presser plate 9 together with its springs 10 and 11 and its supporting studs 12 and 13, are all moved bodily downwardly relative to the back wall 41, in the direction of the arrow A in Fig. 1, the shanks of the studs 12 and 13 sliding downwardly in the elongated slots 14 and 15. As a result of this downward movement of the parts, apertures 17 in the presser plate 9 are now brought into alignment with the supporting projections or protuberances 16 on the aperture plate 2. Thus, when the camera back 41 is closed, the presser plate 9 will not rest on the supports 16, because the apertures 17 will be opposite these supports, and the presser plate can move slightly farther forwardly under the influence of its spring 10 and 11, in order to give the proper pressure against a thinner film. When it is desired to resume the use of standard film with a paper backing, the parts 9—13 are simply adjusted vertically upwardly along the slots 14 and 15 (the camera back being opened up relative to the body, of course, at the time of adjustment) so that when the back is again closed, the solid parts of the presser plate 9, rather than the apertures 17, will be alined with the supporting protuberances 16, and will define a film channel of the proper thickness. Any suitable frictional retaining means, not here shown specifically, may be employed for retaining the parts 9—13 in one or the other of their positions of adjustment.

If it is desired to enable adjustment of the parts to three or more different thicknesses of film channel, instead of merely two, the same principles of the invention may be utilized, and the protuberances 16 may be formed with a plurality of steps of different heights, instead of having only a single height and sloping sides as shown in Fig. 2. Adjustment of the plate 9 to various positions enables it to rest on one or another of the steps of different heights. Or a reverse arrangement may be used, having steps of different heights on the presser plate 9, for cooperation with a fixed part on the aperture plate or frame plate 2.

To accommodate the camera to film of different widths as well as different thicknesses, there may be provided a supplemental aperture plate or frame plate 18 which, when desired, can be placed in the aperture of the main or normal aperture plate 2, to be supported therein and to be frictionally retained therein. This supplemental aperture plate or frame plate 18 has, along opposite sides of its smaller-sized framing aperture, vertical guide rails 19 and 20, whose rear surfaces lie a little to the rear of the rear surfaces of the rest of the plate 18, the rear surfaces or guiding surfaces of these rails 19 and 20 being in exactly the same plane as the rear surfaces or guiding surfaces of the main or normal guide rails 3 and 4. Lugs or ears 21 fixed to the supplemental aperture plate 18 extend laterally therefrom, overlapping the rear faces of the main guide rails 3 and 4, so as to hold the supplemental plate 18 in proper position. The presser plate 9 may be recessed or apertured at points opposite the ears 21, to avoid interference with these ears. When using narrower film with this supplemental aperture plate, shorter film spools are used in the spool chambers of the camera, in known manner, the usual adapters being placed at the ends of the film spools as well understood in the art.

The narrow widths of film, such as 35 millimeter film which might be used with a camera of this type, ordinarily comes without the protective paper backing, and thus is thinner than the standard roll of film (for example, size 120 or 620) which is normally used in a camera of this type when the supplemental aperture plate 18 is not employed, and which has the protective paper backing. Consequently, although there may be occasional exceptions, yet in normal practice when the supplemental aperture plate or frame plate 18 is inserted to adapt the camera to the use of narrow film such as 35 millimeter film, the presser plate should also be adjusted in the direction of the arrow A (Fig. 1) to form a thinner film channel as well as a narrower one. In order to make this adjustment automatically in case the user of the camera forgets to adjust the thickness of the film channel, the supplemental aperture plate 18 may be provided at its upper edge with cam surfaces 33 (Fig. 3) extending obliquely upwardly and rearwardly. When the camera back is closed, if the presser plate 9 has already been adjusted downwardly to its lower position for forming a thinner film channel, these cam surfaces 33 will have no effect. But if such downward adjustment of the presser plate has been overlooked prior to closing the camera back, then the oblique cam surfaces 33 will engage the upper edge of the presser plate 9 as the camera back is closed, and will cam the presser plate downwardly so as to adjust it for the thinner film channel required for the narrower film.

Figure 4:
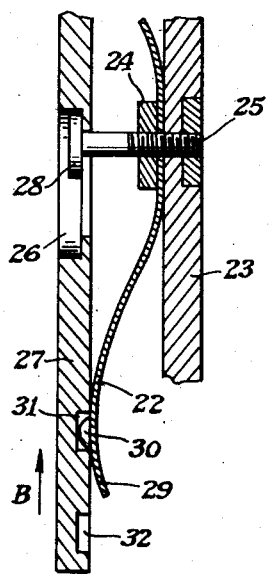
Fig. 4 is a view similar to a fragment of Fig. 2, showing an alternative form of construction.

In Fig. 4 there is shown a different embodiment of construction for supporting the presser plate from the camera back wall. In the previous embodiment (Figs. 1–3) the springs and the presser plate all move together, as a unit, relative to the back wall, when the presser plate is adjusted from one position to another. In this other embodiment shown in Fig. 4, however, the springs and the supporting studs or screws remain bodily fixed relative to the back wall, and only the presser plate itself moves when it is adjusted to provide a film channel of different thickness.

In this embodiment shown in Fig. 4, the back wall of the camera is indicated at 23, and the presser plate is shown at 27. The spring 22 is held by a nut or collar 24 on the stud 25, these parts being in fixed relation to the back wall 23. The head 28 at the forward end of the stud 25 passes through a vertically elongated slot in the presser plate 27 and is received in a vertically elongated groove 26 in this plate. Thus the presser plate 27 may be moved upwardly or downwardly relative to the stud 25 and back wall 23, for the same purpose as previously mentioned in connection with the presser plate 9, the presser plate 27 having the same apertures 17 for cooperating with supporting abutments 16 on the camera frame plate or aperture plate 2.

Moreover, each end 29 of each spring 22 may be provided with a rounded forwardly extending protuberance 30, and the rear face of the presser plate 27 may be provided with recesses or pockets 31 and 32 for receiving the projection 30 and for frictionally retaining the presser plate in one or the other of its adjusted positions. In Fig. 4, the presser plate is shown in the lower of its two positions, in which (just as in the case of the presser plate 9 in Fig. 3) the apertures 17 of the presser plate will be alined with the protuberances 16, and the parts will be adjusted for a thin film channel. If the presser plate is moved upwardly in the direction of the arrow B in Fig. 4, then the projection 30 on the spring 22 will slide out of the recess 31 and will enter the recess 32 of the presser plate, and the presser plate, now in its upper position, will have its apertures 17 offset from the projections 16, like the presser plate 9 in Fig. 1, and thus will rest on the projections 16 and will provide a thicker film channel.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a body portion and a back portion movable to open and closed positions relative to said body portion, said back portion when closed being stationary relative to said body portion, a support member on said body portion for engaging one face of a film to hold it in exposure making position, a presser plate mounted on said back portion for engaging the opposite face of the film when the back portion is in closed position, said presser plate being mounted for movement relative to said back portion both in a direction perpendicular to the film and in a direction parallel to the film, spring means tending to press said presser plate forwardly toward said support member, when said back is closed, and abutment means on the camera lying in the path of said presser plate and limiting the extent to which said spring means may press said presser plate toward said support member to define the thickness of the film channel between said support member and said presser plate, said abutment means and said presser plate having contacting surfaces so shaped that when said presser plate is moved in a direction parallel to the film, from a first position to a second position, said contacting surfaces will hold said presser plate at a greater distance from said support member to define a greater thickness of film channel than when said presser plate is in said first position.

2. A construction as defined in claim 1, in which said contacting surfaces of said abutment means and presser plate include a plurality of abutment surfaces in stationary position relative to said camera when said back portion and said body portion are in closed position with respect to each other, and a plurality of recessed portions in said presser plate for receiving said abutment surfaces when said presser plate is in one of its said two positions of movement in a direction parallel to the film.

3. A construction as defined in claim 1, further including a supplementary support member removably associated with the main support member to reduce the size of the exposure area of the film, said supplementary support member having a film engaging surface for holding a narrower film in the same plane of exposure as that in which a wider film is held by the main support member, said supplementary support member having a portion lying in the path of said presser plate, upon closing said back portion with respect to said body portion, when said presser plate is in its said second position, to prevent full closing of said back portion with respect to said body portion until said presser plate has been moved to its said first position, whenever said supplementary support member is in normal effective position associated with the main support member.

4. A photographic camera including a camera body having near its rear end an aperture plate structure including film edge supporting rails projecting rearwardly beyond the main portion of said structure at the lateral edges of an exposure area defined by said aperture plate structure, said structure also including a plurality of spaced abutments projecting rearwardly beyond the rear faces of said supporting rails, a camera back movable between open and closed positions relative to said camera body, said back including an approximately flat wall portion arranged, when in closed position, behind and approximately parallel to said aperture plate structure, a presser plate mounted on said camera back between said flat wall portion and said aperture plate structure, spring means interposed between said presser plate and said flat wall portion to tend to press said presser plate forwardly toward said supporting rails, and a loose connection between said presser plate and said flat wall portion whereby said presser plate may be shifted relatively to said flat wall portion in a direction approximately parallel to the plane of said flat wall portion, said presser plate when in one position of adjustment relative to said back having portions engaging said abutments of said aperture plate structure to space said presser plate a predetermined distance from said supporting rails and having openings alined with said abutments when said presser plate is shifted to another position of adjustment relative to said back so that said presser plate may then move farther forwardly and closer to said supporting rails notwithstanding said abutments.

REINHOLD HEIDECKE.

References Cited in the file of this patent

UNITED STATES PATENTS

| Number | Name | Date |
|---|---|---|
| 1,270,866 | Power | July 2, 1918 |
| 1,273,328 | Cameron | July 23, 1918 |
| 1,404,707 | Brown | Jan. 24, 1922 |
| 1,728,670 | Dina | Sept. 17, 1929 |
| 2,147,106 | Nuchterlein | Feb. 14, 1939 |
| 2,336,279 | Mihalyi | Dec. 7, 1943 |
| 2,457,915 | Nemeth | Jan. 4, 1949 |